(No Model.)

C. ZIMMERMAN.
WAGON SEAT.

No. 314,410. Patented Mar. 24, 1885.

ATTEST.
J. Henry Kaiser.
Wm O. Garner.

INVENTOR.
Casper Zimmerman
by L. Deane
his Attorney

UNITED STATES PATENT OFFICE.

CASPER ZIMMERMAN, OF OWATONNA, MINNESOTA.

WAGON-SEAT.

SPECIFICATION forming part of Letters Patent No. 314,410, dated March 24, 1885.

Application filed November 22, 1884. (No model.)

*To all whom it may concern:*

Be it known that I, CASPER ZIMMERMAN, a citizen of the United States, residing at Owatonna, in the county of Steele and State of Minnesota, have invented certain new and useful Improvements in Wagon-Seats, of which the following is a specification, reference being had therein to the accompanying drawings.

Figure 1:
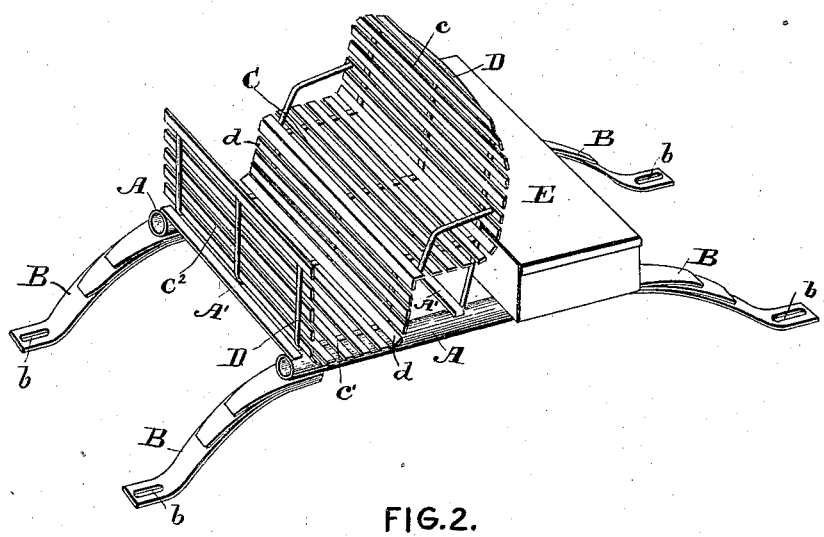
Figure 2:
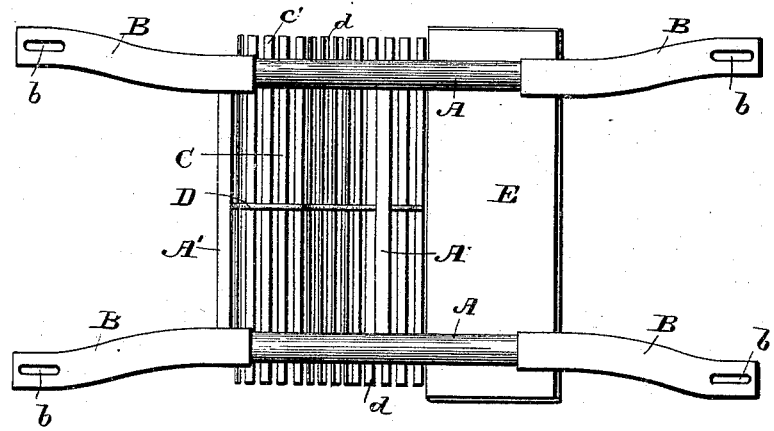
Figure 3:
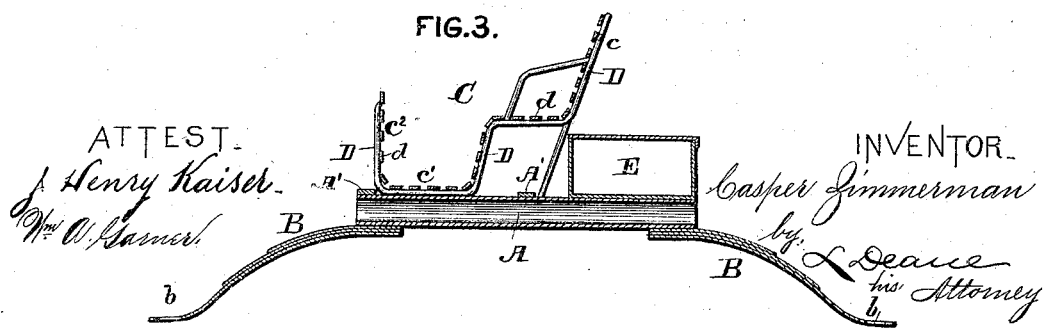

Figure 1 is a perspective view of my improved spring wagon-seat complete. Fig. 2 is a bottom view of the seat. Fig. 3 is a longitudinal section taken centrally through one of the tubular side bars and its end springs.

This invention relates to portable spring-seats which are especially designed for wagons used in the transportation of lumber, wherein it is desired at times to dispense with the body or box and use the running-gear alone.

The nature of my invention consists, essentially, in a wagon-seat including the floor or foot-rest and dasher, which is composed of a very light but rigid frame provided with stiff tubular side bars and light end springs therefor, which bars are connected together by means of the frame of the seat proper, and also by means of a tool or tail box, the whole constituting a portable spring-seat possessing great strength and lightness, combined with ease of motion, as will be fully understood from the following description, when taken in connection with the annexed drawings.

The frame of my improved spring wagon-seat consists of two longitudinal side bars, A A, which are made of metal tubes or wooden bars to afford great strength and lightness. These bars are parallel to each other, and they are secured together by means of light cross-bars A' A'.

To the extremities of the tubular side bars, A A, I rigidly secure in a suitable manner springs B B B B, which are preferably of the curved form shown in the drawings, and which are composed of a number of leaves like the well-known compound springs. The outer flattened ends of said springs are slotted longitudinally, as shown at *b*, for the purpose of allowing free endwise play when they are secured by screws to the running-gear bolsters of a wagon.

The seat proper, C, is provided with a back, *c*, a floor or foot-rest, *c'*, and a dash-board, *c²*. I construct this seat of a frame composed of metal rods D, bent in the manner shown in the drawings, (see Fig. 1,) and rigidly secured to each other and the tubular side bars, A A. Transversely across said seat-frame I secure narrow wooden slats *d*, which form a light open support for the rider.

Immediately in rear of the seat is a box, E, provided with a hinged cover, and designed as a receptacle for tools and other articles, which are always required about a wagon, and which at times it is desired to safely stow away. This storage-box E is arranged transversely across the tubular side bars, A A, and rigidly secured to both of them, thereby serving as an additional brace and tie therefor.

It will thus be seen that I have an exceeding light spring-seat, wherein the several parts composing it are so utilized that they mutually strengthen each other.

My improved seat may be secured to the bolsters of the running-gear of a wagon when it is not desired to use a box or body on the running-gear; or it may be supported upon the floor of the wagon-box if the latter is used; or it may be mounted on top of a wagon loaded with lumber or other material.

I do not broadly claim a tool-box applied to a vehicle; neither do I claim a seat-spring or a running-gear for vehicles.

My invention is a portable combined seat and spring therefor, which can be mounted upon a load of lumber or upon the floor of a wagon-body, to be removed or replaced at will.

Having described my invention, I claim as new—

1. A portable spring-wagon-seat consisting of the seat and its foot-stand, parallel tubes rigidly secured thereto, and independent short end springs rigidly secured to said tubes, substantially as described.

2. The within-described portable wagon-seat, consisting of the parallel tubes, the cross-braces A' A' E, the latter being a box, the four end springs secured to the ends of said tubes, and a seat and foot-stand secured directly upon the tubes A A, substantially as described.

In testimony whereof I affix my signature in presence of two witnesses.

CASPER ZIMMERMAN.

Witnesses:
E. W. RICHTER,
F. C. WEBB.